US009990904B2

(12) United States Patent
Huang et al.

(10) Patent No.: US 9,990,904 B2
(45) Date of Patent: Jun. 5, 2018

(54) PIXEL ARRAY SUITABLE FOR SLIM BORDER DESIGNS

(71) Applicant: E Ink Holdings Inc., Hsinchu (TW)

(72) Inventors: Ya-Chen Huang, Hsinchu (TW); Puru Howard Shieh, Hsinchu (TW); Ni-Yeh Wu, Hsinchu (TW); Pei-Lin Huang, Hsinchu (TW); Chi-Ming Wu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days. days.

(21) Appl. No.: 15/393,274

(22) Filed: Dec. 29, 2016

(65) Prior Publication Data
US 2017/0110091 A1    Apr. 20, 2017

Related U.S. Application Data

(63) Continuation-in-part of application No. 14/489,475, filed on Sep. 18, 2014, now Pat. No. 9,569,993.

(30) Foreign Application Priority Data

Jan. 23, 2014   (TW) .............................. 103102461 A
Nov. 25, 2016   (CN) .......................... 2016 1 1052712

(51) Int. Cl.
*G09G 3/36*     (2006.01)
*G09G 5/10*     (2006.01)
*G09G 3/20*     (2006.01)

(52) U.S. Cl.
CPC ............. *G09G 5/10* (2013.01); *G09G 3/2092* (2013.01); *G09G 2300/0404* (2013.01);
(Continued)

(58) Field of Classification Search
CPC .................. G09G 5/10; G09G 3/2092; G09G 2320/0233; G09G 2300/0439
See application file for complete search history.

(56) References Cited

U.S. PATENT DOCUMENTS

2006/0181498 A1   8/2006  Toyozawa et al.
2010/0066967 A1   3/2010  Takahashi et al.
(Continued)

FOREIGN PATENT DOCUMENTS

| CN | 1550854 | 12/2004 |
|---|---|---|
| TW | I356958 | 1/2012 |
| TW | 201530240 | 8/2015 |

OTHER PUBLICATIONS

"Office Action of Taiwan Counterpart Application", dated Mar. 2, 2017, p. 1-p. 4.

*Primary Examiner* — Jonathan Blancha
(74) *Attorney, Agent, or Firm* — JCIPRNET

(57) ABSTRACT

A pixel array including first signal lines, second signal lines, active elements, pixel electrodes and selection lines is provided. The second signal lines and the selection lines are intersected with the first signal lines respectively. Each first signal line has a bridge point at an intersection with the one of the selection lines. At least one of the selection lines is disposed between two neighboring second signal lines. Amounts of the first signal lines and the selection lines are larger than an amount of the second signal lines respectively, and an amount of second signal lines intersected with a connection line between the bridge point of the $i^{th}$ first signal line and the bridge point of the $(i+1)^{th}$ first signal line is one, i=1 to N, and N is the amount of the first signal lines.

10 Claims, 8 Drawing Sheets

(52) U.S. Cl.
CPC ........ *G09G 2300/0426* (2013.01); *G09G 2300/0439* (2013.01); *G09G 2300/08* (2013.01); *G09G 2320/0233* (2013.01)

(56) References Cited

U.S. PATENT DOCUMENTS

| | | |
|---|---|---|
| 2013/0181605 A1 | 7/2013 | Chang et al. |
| 2014/0043306 A1* | 2/2014 | Min ............... G09G 3/3685 345/204 |
| 2015/0214246 A1 | 7/2015 | Wu et al. |

* cited by examiner

PIXEL ARRAY SUITABLE FOR SLIM BORDER DESIGNS

CROSS-REFERENCE TO RELATED APPLICATION

This application is a continuation-in-part application of and claims the priority benefit of a prior application Ser. No. 14/489,475, filed on Sep. 18, 2014, now allowed. The prior application Ser. No. 14/489,475 claims the priority benefit of Taiwan application serial no. 103102461, filed on Jan. 23, 2014. This application also claims the priority benefit of China application serial no. 201611052712.3, filed on Nov. 25, 2016. The entirety of each of the above-mentioned patent applications is hereby incorporated by reference herein and made a part of this specification.

BACKGROUND

Technical Field

The invention relates to a pixel array, and particularly relates to a pixel array suitable for slim border designs.

Related Art

Generally, as a screen is developed towards a trend of lightweight and a profile thereof is developed to have the maximum display region, a non-display region used for shielding connection lines at periphery of the screen is reduced to enlarge the display region of the screen, so as to cope with the design requirement of slim border. A method for narrowing a frame border is developed in recent years, by which selection lines are configured besides scan lines and data lines, where the selection lines are electrically connected to the corresponding scan lines through bridge points. In this way, a chip can transmit scan signals to the corresponding scan lines through the selection lines. According to such layout design, since both of the scan lines and the data lines are wired to the chip from the same side of the display region, a width of the non-display region is narrowed, so as to cope with the design requirement of slim border.

However, the limitation of the wire design of the selection line often results in that the distribution of bridge points is not continuous, so that the resistor-capacitor (RC) is not continuous. Therefore, when a signal is transmitted (e.g., the scan signal is transmitted to the corresponding pixel), charging time for neighbouring pixels corresponding to the neighbouring scan lines may be different because of the difference of the distances between the bridge points and the neighbouring pixels, thereby resulting in the generation of band mura, so that the display quality is influenced.

SUMMARY

The invention is directed to a pixel array, which is capable of reducing the generation of band mura.

The invention provides a pixel array including a plurality of first signal lines, a plurality of second signal lines, a plurality of active elements, a plurality of pixel electrodes and a plurality of selection lines. The second signal lines are electrically insulated from the first signal lines, and are intersected with the first signal lines to define a plurality of pixel regions. The active elements are located in the pixel regions, and each of the active elements is electrically connected to a corresponding first signal line and a second signal line. The pixel electrodes are disposed corresponding to the pixel regions, and are electrically connected to the active elements. The selection lines and the first signal line are intersected, wherein each of the first signal lines is electrically connected to one of the selection lines and has a bridge point at an intersection with the one of the selection lines. The selection lines are electrically insulated from the second signal lines, and at least one selection line is disposed between two neighbouring second signal lines. Amounts of the first signal lines and the selection lines are respectively larger than an amount of the second signal lines, and an amount of second signal lines intersected with a connection line between the bridge point of the $i^{th}$ first signal line and the bridge point of the $(i+1)^{th}$ first signal line is one, where i=1 to N, and N equals to the amount of the first signal lines.

In one embodiment of the invention, a line connected sequentially from the bridge point of the first one of the first signal lines to the bridge point of the last one of the first signal lines forms a polyline, and the polyline has at least one turning point.

In an embodiment of the invention, plural of the selection lines are disposed between a portion of the two neighbouring second signal lines.

In an embodiment of the invention, plural of the bridge points are disposed between a portion of the two neighbouring second signal lines.

In an embodiment of the invention, an amount of the bridge points between the two neighbouring second signal lines is less than or equal to an amount of the selection lines between the two neighbouring second signal lines.

In an embodiment of the invention, the bridge points are intersected respectively with different selection lines.

In an embodiment of the invention, an amount of the at least one turning point is j, and an amount of the at least one selection line between the two neighbouring second signal lines is j or (j+1), where j≥1.

In an embodiment of the invention, an amount of the at least one selection line between the two neighbouring second signal lines is k, and an amount of the at least one turning point is k or (k±1), where k≥2.

In an embodiment of the invention, the selection lines and the pixel electrodes do not overlap.

In an embodiment of the invention, the selection lines and the second signal lines are located on the same layer, and the select lines and the first signal lines are located on different layers.

According to the above descriptions, in the pixel array of the invention, by making an amount of second signal lines intersected with a connection line between the bridge points of two neighbouring first signal lines to be one, the distance between the bridge points of the neighbouring first signal lines may be shortened, thereby decreasing the difference of charging time for neighbouring pixels corresponding to neighbouring first signal lines, improving the band mura phenomenon and enhancing the display quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
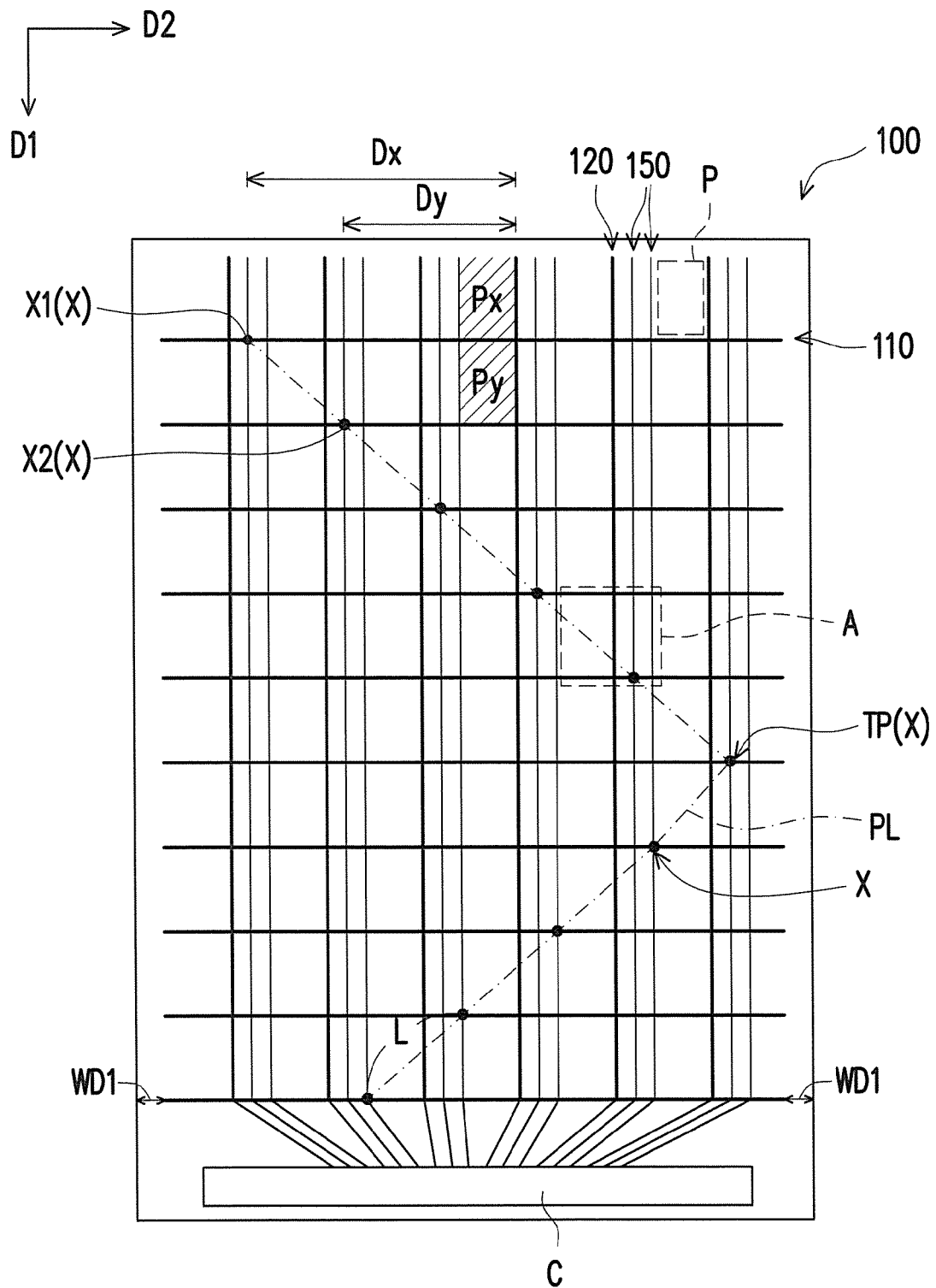
FIG. 1A is a top view of a pixel array according to the first embodiment of the invention.
Figure 1B:
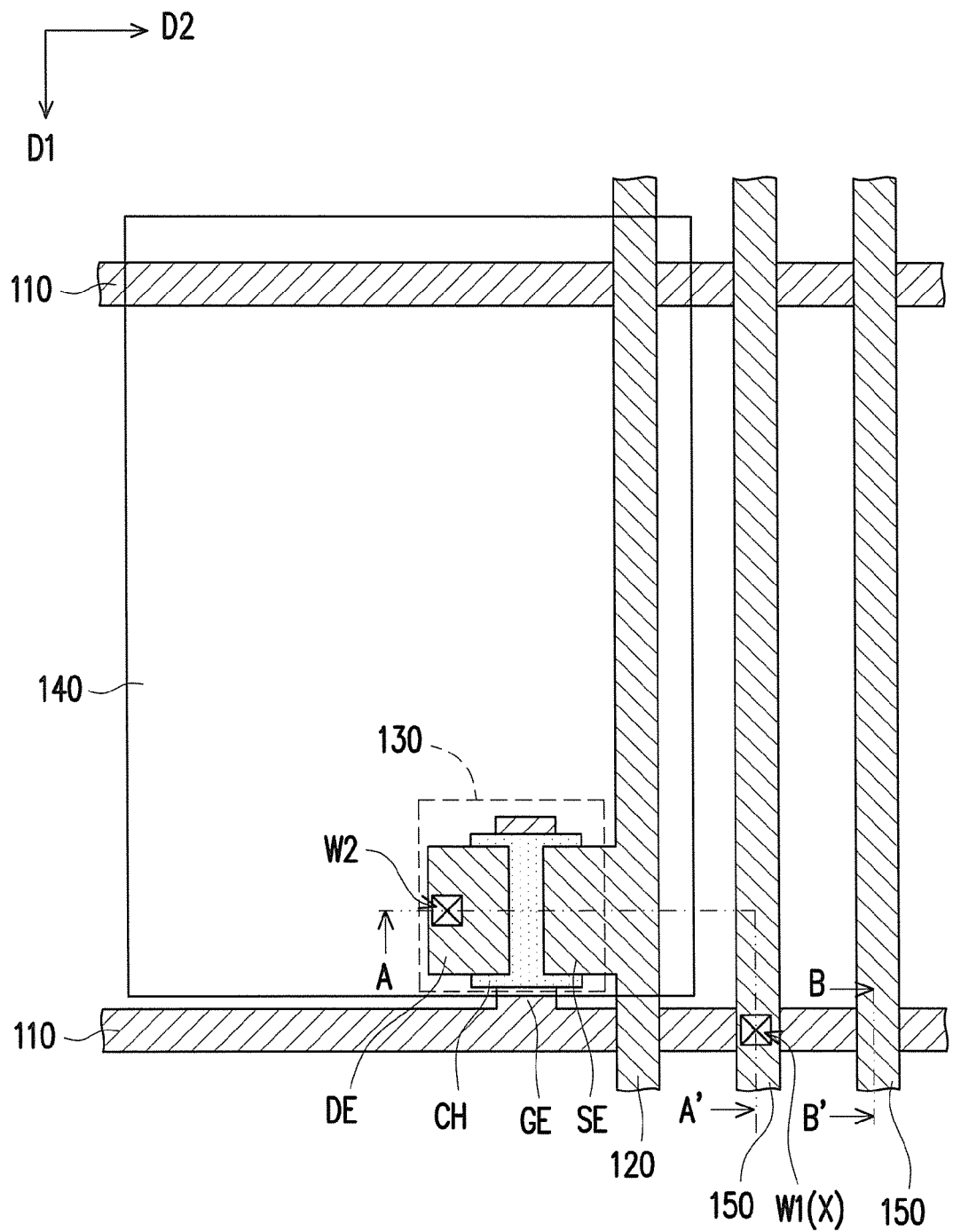
FIG. 1B is an enlarged view of a region A in FIG. 1A.
Figure 1C:
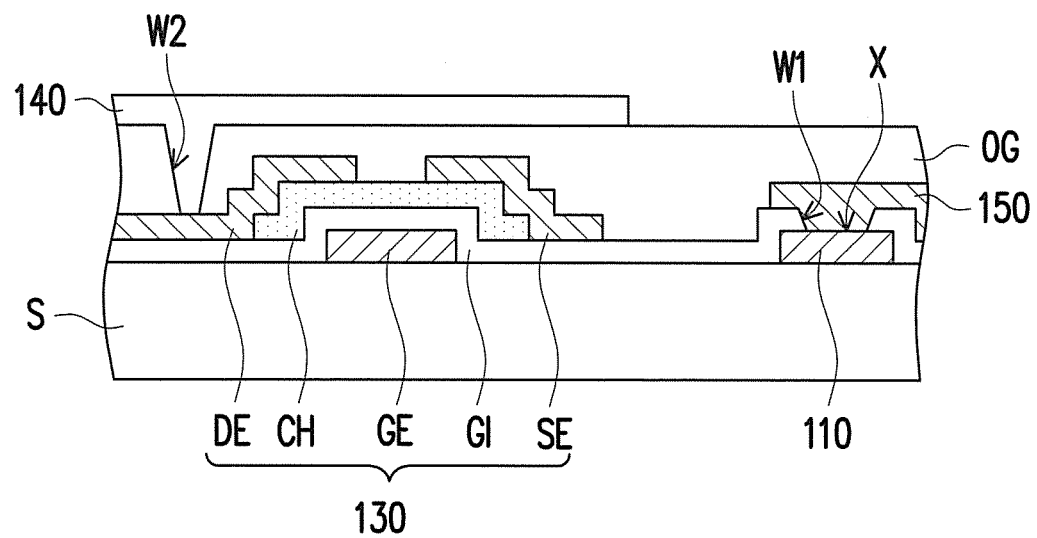
FIG. 1C and FIG. 1D are respectively cross-sectional views of FIG. 1B viewing along section lines A-A' and B-B'.
Figure 1D:
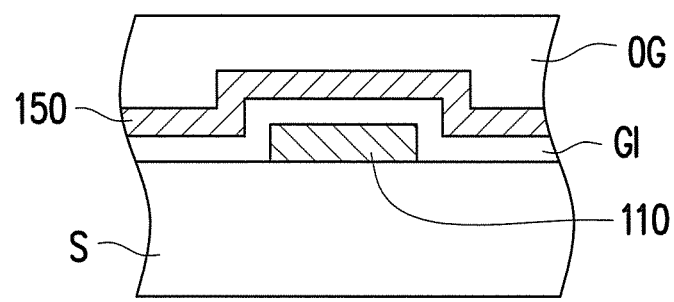

FIG. 1A is a top view of a pixel array according to the first embodiment of the invention. FIG. 1B is an enlarged view of a region A in FIG. 2A. FIG. 1C and FIG. 1D are respectively cross-sectional views of FIG. 1B viewing along section lines A-A' and B-B'.

Referring to FIG. 1A to FIG. 1D, a pixel array 100 of the embodiment includes a plurality of first signal lines 110, a plurality of second signal lines 120, a plurality of active elements 130, a plurality of pixel electrodes 140 and a plurality of selection lines 150.

The second signal lines 120 are electrically insulated from the first signal lines 110, and are intersected with the first signal lines 110 to define a plurality of pixel regions P. For example, the first signal lines 110 are arranged along a first direction D1 and respectively extend along a second direction D2. The second signal lines 120 are arranged along the second direction D2 and respectively extend along the first direction D1. The first direction D1 is intersected with the second direction D2, and the first direction D1 is, for example, perpendicular to the second direction D2, but the invention is not limited thereto.

The active elements 130 are located in the pixel regions P, and each of the active elements 130 is electrically connected to a corresponding first signal line 110 and a corresponding second signal line 120. In the embodiment, each of the pixel regions P is configured with one active element 130, but the invention is not limited thereto. In another embodiment, each of the pixel regions P may also be configured with plural of the active elements 130.

The active elements 130 are, for example, disposed on a substrate S, and each of the active elements 130 includes a gate electrode GE, a gate insulation layer GI, a channel layer CH, a source electrode SE and a drain electrode DE. In the embodiment, the gate electrode GE and the first signal line 110 are disposed on the substrate S, and the first signal line 110 is electrically connected to the gate electrode GE. The gate insulation layer GI covers the gate electrode GE and the first signal line 110, and the gate insulation layer GI has a plurality of openings W1. Each of the openings W1 exposes a part of one of the first signal lines 110. The channel layer CH is disposed on the gate insulation layer GI, and is located above the gate electrode GE. The source electrode SE and the drain electrode DE are disposed on the channel layer CH, and are respectively located at two opposite sides of the channel layer CH. The source electrode SE is electrically connected to the second signal line 120.

In the embodiment, although a bottom gate thin film transistor is used to implement the active element 130, the invention is not limited thereto. In another embodiment, types of the active elements 130 or the laminated structures thereof may be varied according to different design requirements. Moreover, types of signals transmitted by the first signal lines 110 and the second signal lines 120 are not limited by the invention. In the embodiment, the first signal line 110 is electrically connected to the gate electrode GE, and the second signal line 120 is electrically connected to the source electrode SE, so that the first signal lines 110 are used for transmitting scan signals, and the second signal lines 120 are used for transmitting data signals. In another embodiment, if the second signal line 120 is electrically connected to the gate electrode GE, and the first signal line 110 is electrically connected to the source electrode SE, the second signal lines 120 are used for transmitting the data signals, and the first signal lines 110 are used for transmitting the scan signals.

Moreover, the pixel array 100 of the embodiment may further include an insulation layer OG to protect the above-mentioned devices, where the insulation layer OG covers the active elements 130, the selection lines 150 and the gate insulation layer GI. In addition, the insulation layer OG has a plurality of openings W2, and each of the openings W2 exposes a part of one of the drain electrodes DE. The pixel electrodes 140 are disposed corresponding to the pixel regions P, and are electrically connected to the active elements 130. In detail, the pixel electrode 140, for example, contacts the drain electrode DE through the opening W2. In the embodiment, the pixel electrodes 140 further cover a part of the first signal lines 110 and the second signal lines 120, and the selection lines 150 are not overlapped with the pixel electrodes 140, but the invention is not limited thereto.

The selection lines 150 are electrically insulated from the second signal lines 120, and are intersected with the first signal lines 110, where each of the first signal lines 110 is electrically connected to one of the selection lines 150 and has a bridge point at an intersection with said one of the selection lines 150. To be specific, the selection lines 150 are, for example, arranged along the second direction D2 and respectively extend along the first direction D1. In the embodiment, the selection lines 150 and the second signal lines 120 are located in the same layer, and the selection lines 150 and the first signal lines 110 are located in different layers. In detail, the gate electrodes GE and the first signal lines 110 may be formed by patterning a first metal layer, and the second signal lines 120, the selection lines 150, the source electrodes SE and the drain electrodes DE may be formed by patterning a second metal layer, but the invention is not limited thereto. In another embodiment, the first signal lines 110, the source electrodes SE and the drain electrodes DE may be formed by patterning the first metal layer, and the gate electrodes GE, the second signal lines 120 and the selection lines 150 may be formed by patterning the second metal layer. Under this structure, the first signal lines 110 and the source electrodes SE are electrically connected to transmit data signals, and the second signal lines 120 and the gate electrodes GE are electrically connected to transmit scan signals. Additionally, the selection lines 150 and the first signal lines 110 are electrically connected through the openings W1 to transmit the data signals. It should be noted that the first metal layer and the second metal layer are only used for distinguishing film layers formed through different fabrication processes, and are not used for limiting a formation sequence of the metal layers. In an actual fabrication process, the first metal layer can be fabricated before or after the second metal layer is fabricated.

By configuring the selection lines 150, both of the first signal lines 110 and the second signal lines 120 may be wired to the chip side from the same side of the pixel array 100 for connecting to the chip C, which avails narrowing widths WD1 of the non-display regions of the left and right sides of the pixel array 100, so that the display apparatus using the pixel array 100 of the embodiment conforms to the design requirement of slim border.

In the structure of the invention, amounts of the first signal lines 110 and the selection lines 150 are respectively greater than an amount of the second signal lines 120, and the amount of the selection lines 150 and the configuration types thereof may be different based on the relationship between the amounts of the first signal lines 110 and the second signal lines. However, at least one selection line 150 is disposed between two neighbouring second signal lines 120, and an amount of second signal lines 120 intersected with a connection line L between the bridge point X of the $i^{th}$ first signal line 110 and the bridge point X of the $(i+1)^{th}$ first signal line 110 is one, i=1 to N, and N equals to the amount of the first signal lines 110.

By making the amount of the second signal lines 120 intersected with the connection line L between the bridge points X of the two neighbouring first signal lines 110 to be one, the distance between the bridge points X of the neighbouring first signal lines 110 in the second direction D2 may be shortened, i.e. the difference of the distances between the neighbouring pixels corresponding to the neighbouring first signal lines 110 and the corresponding bridge points X may be shortened. For example, the difference between the distance Dx, which is between the pixel Px and the corresponding bridge point X1, and the distance Dy, which is between the pixel Py and the corresponding bridge point X2 may be shortened, so that the distribution from the bridge point X (i.e., the bridge point X1) of the first one of the first signal lines 110 to the bridge point X of the last one of the first signal lines becomes more continuous. Accordingly, when the chip C transmits signals (e.g., scan signals) to the pixel (including the active element 130 and the pixel electrode 140), the difference of charging time between the neighbouring pixels corresponding to the neighbouring first signal lines 110 may be reduced, thereby improving the band mura phenomenon and enhancing the display quality.

In the embodiment, a line connected sequentially from the bridge point X of the first one of the first signal lines 110 to the bridge point of the last one of the first signal lines 110 forms a polyline PL, and the polyline has at least one turning point TP. The location of the at least one turning point is the location of the at least one bridge point X. In FIG. 1A, it is assumed that the turning point TP is corresponding to the bridge point X of the $n^{th}$ first signal line 110. For the convenience of description, the bridge points X before the $n^{th}$ first signal line 110 (i.e., the bridge points X of the first to $(n-1)^{th}$ first signal lines 110) are referred to front bridge points, and the bridge points X after the $n^{th}$ first signal line 110 (i.e., the bridge points X of the $(n+1)^{th}$ to $N^{th}$ first signal lines 110) are referred to back bridge points.

Under this structure where the amount of the first signal lines 110 is greater than the amount of the second signal lines 120, by the design of the at least one turning point TP, the pixel array 100 may form more bridging points X without changing (i.e., increasing) the amount of the second signal lines 120. The amount of said at least one turning point TP and the amount of the said at least one selection line 150 between two second signal lines 120 are designed as follows. When the amount of said at least one turning point TP is j, the amount of the said at least one selection line 150 between two second signal lines 120 is j or (j+1), and j≥1.

When the amount of said at least one turning point TP is 0, the amount of said at least one selection line 150 between the two neighbouring second signal lines 120 may be one. However, when the amount of said at least one turning point TP is larger than or equals to 1, the selection line 150 connected with the back bridge points may be added between the second signal lines 120 to transmit signals (e.g., the scan signals) to the first signal lines 110 corresponding to the back bridge points. By increasing the amount of the selection lines 150 between the two neighbouring second signal lines 120, plural of selection lines 150 are disposed between the two neighbouring second signal lines 120, a part of the plural of the selection lines 150 may be connected to the front bridge points, and another part of the plural of selection lines 150 may be connected to the back bridge points. Accordingly, the front bridge points and the back bridge points are respectively intersected with different selection lines 150. That is, the first signal lines 110 do not share the same selection line 150. Under this structure, each back bridge point respectively is located between the two neighbouring second signal lines 120 with one of the front bridge points, so that a plural of bridge points X are provided between the two neighbouring second signal lines 120.

It should be noted that the first signal lines 110 may not necessarily electrically connected to all the selection lines 150 between the two neighbouring second signal lines. That is, the amount of the bridge points X between the two neighbouring second signal lines 120 may be smaller than or equals to the amount of the selection lines 150 between the two neighbouring second signal lines 120. For example, one of the two selection lines 150 between the leftmost two second signal line 120 in FIG. 1A may not electrically connected to the first signal lines 110. In another embodiment, the selection line 150 which is not electrically connected to the first signal lines 110 may be omitted.

Hereafter, other types of the pixel array 100 will be explained with FIG. 2 to FIG. 6, wherein the same reference numbers are used in the drawings and the description to refer to the same or like parts and the relative positional relationship and functions of these elements or functions will not be described. FIG. 2 to FIG. 6 are top views of pixel arrays according to the second to sixth embodiments of the invention.

Figure 2:
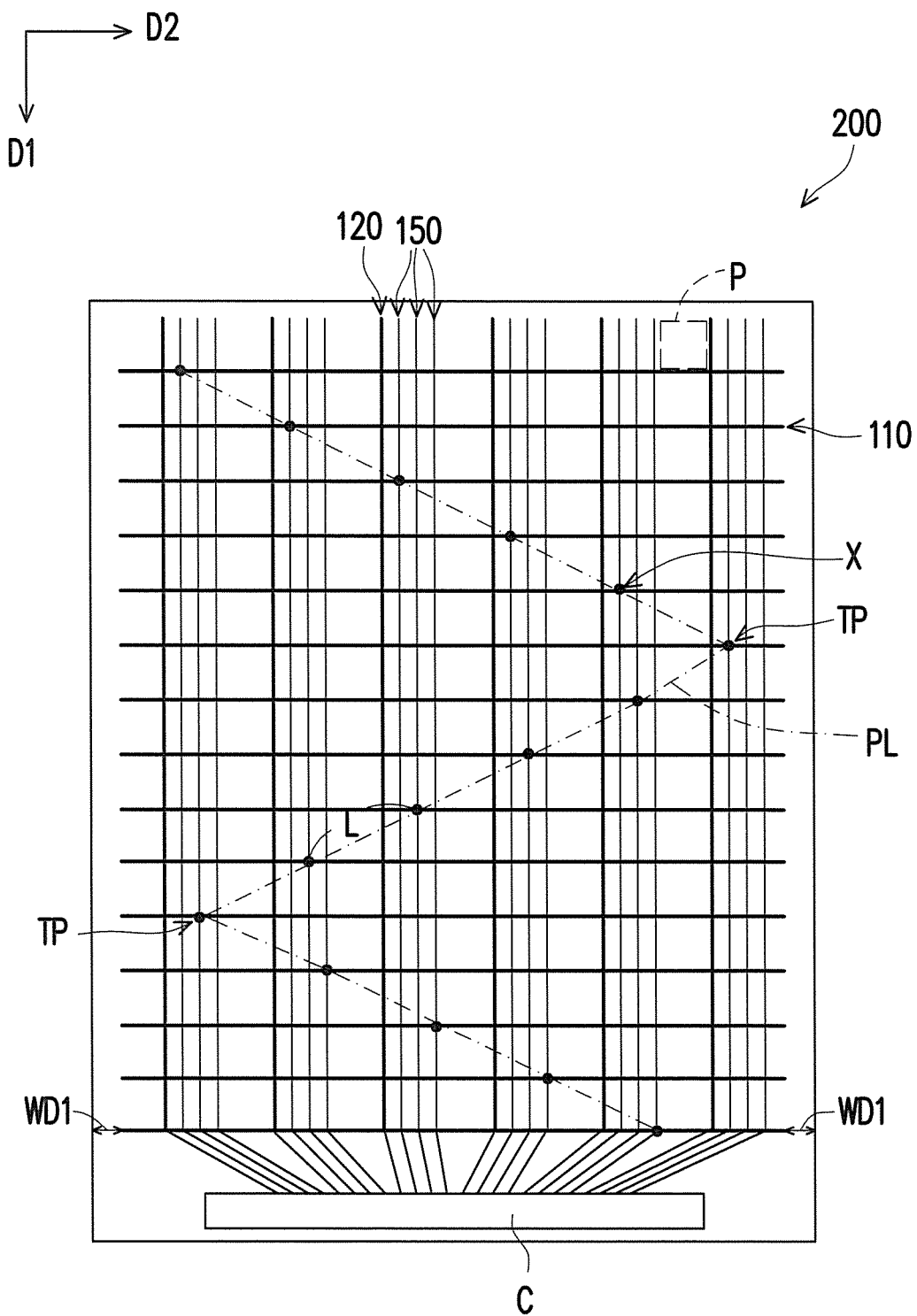
FIGS. 2 to 6 are top views of pixel arrays according to the second to sixth embodiments of the invention.

Referring to FIG. 2, the difference between the pixel array 200 and the pixel array 100 of FIG. 1A is described as follows. In the pixel array 100, the amount of the at least one turning point TP is one and the amount of the at least one selection line 150 between the two neighbouring second signal lines 120 is two. On the other hand, in the pixel array 200, the number of the at least one turning point TP is two, and the amount of the at least one selection line 150 between the two neighbouring second signal lines 120 is three.

In detail, in a case where the amount of the second signal lines 120 is unchanged, as the increase of the first signal lines 110, the pixel array 200 may form more bridge points X by increasing the amount of the turning points TP and the amount of the selection lines 150 between the two neighbouring second signal lines 120.

Figure 3:
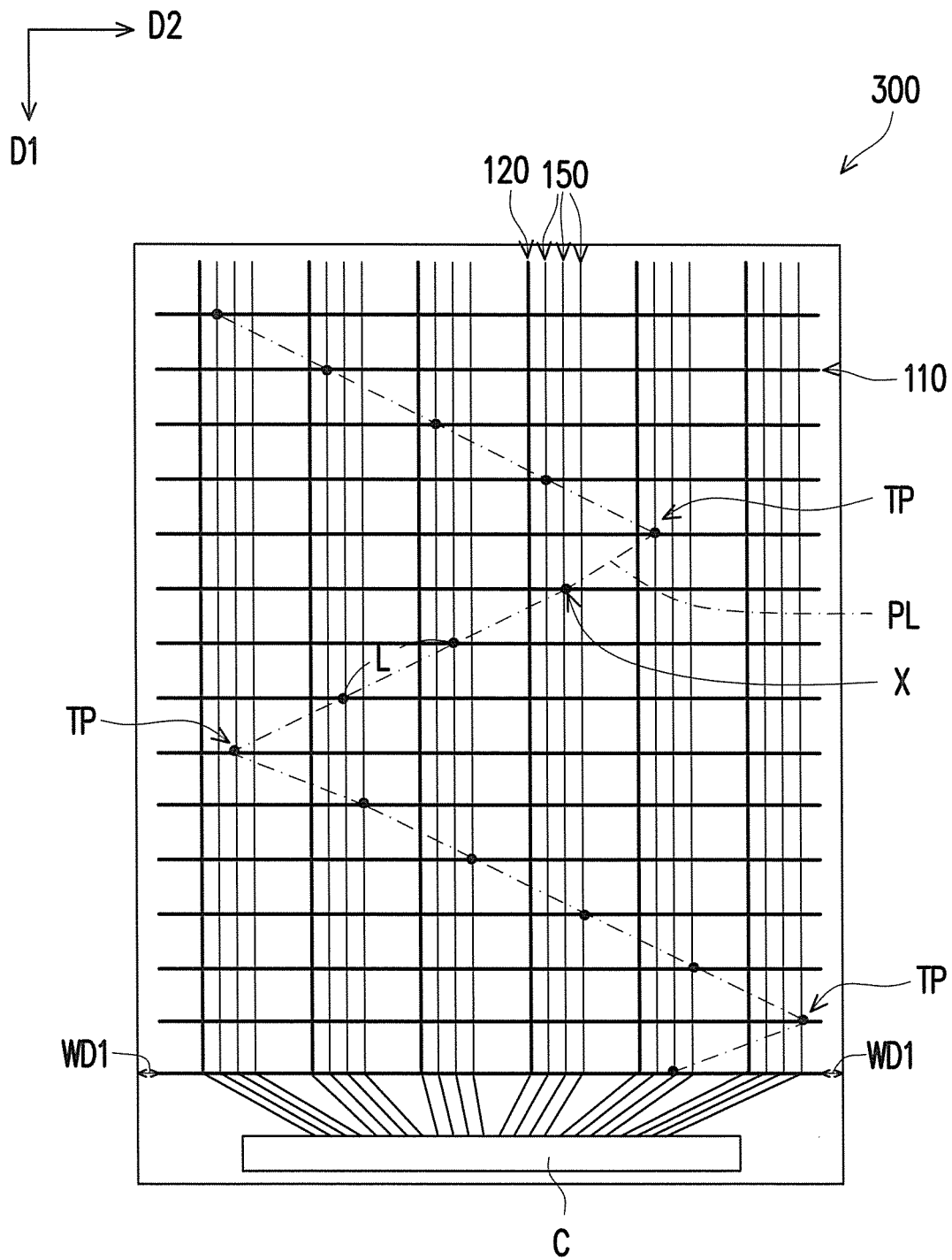
Figure 4:
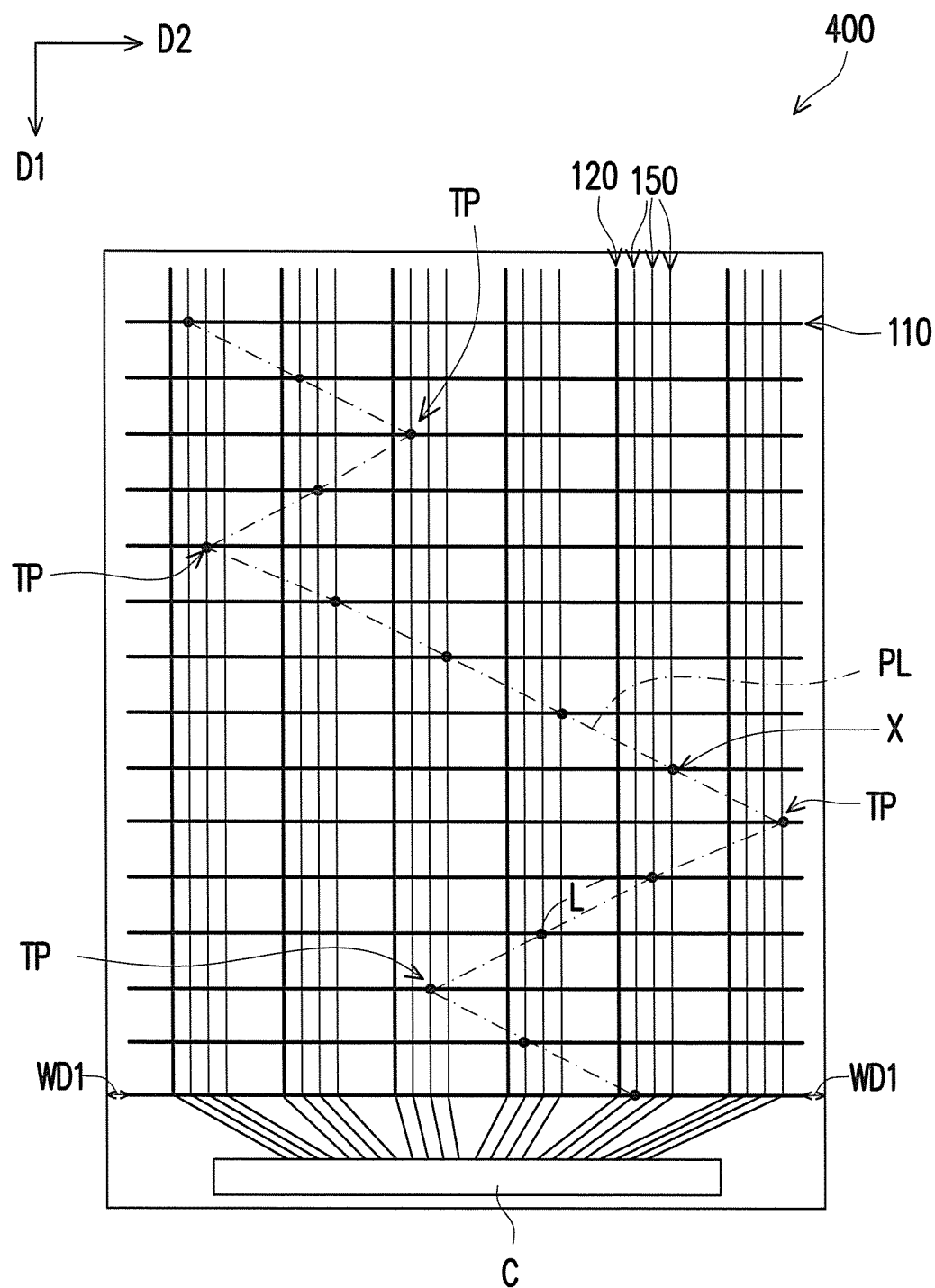

In FIG. 1A and FIG. 2, the turning points TP are located on the edges of the pixel array 100 and the pixel array 200 (near the last one of the second signal lines 120 or the first one of the second signal lines 120). However, the position of the turning points TP may be changed based on the demand. Referring to FIG. 3 and FIG. 4, the turning points TP may be located in the middle or edge of the pixel array 300 and the pixel array 400.

Additionally, when the amount of the at least one select line 150 between the two neighbouring second signal lines 120 is k, the amount of the at least one turning point TP may be k or (k±1), where k≥2. As shown in FIG. 1A and FIG. 2, the amount of the at least one select line 150 between the two neighbouring second signal lines 120 may equal to the amount of the at least one turning point TP plus one. As shown in FIG. 3, the amount of the at least one select line 150 between the two neighbouring second signal lines 120 may equal to the amount of the at least one turning point TP. As shown in FIG. 4, the amount of the at least one select line 150 between the two neighbouring second signal lines 120 may equal to the amount of the at least one turning point TP minus one.

Figure 5:
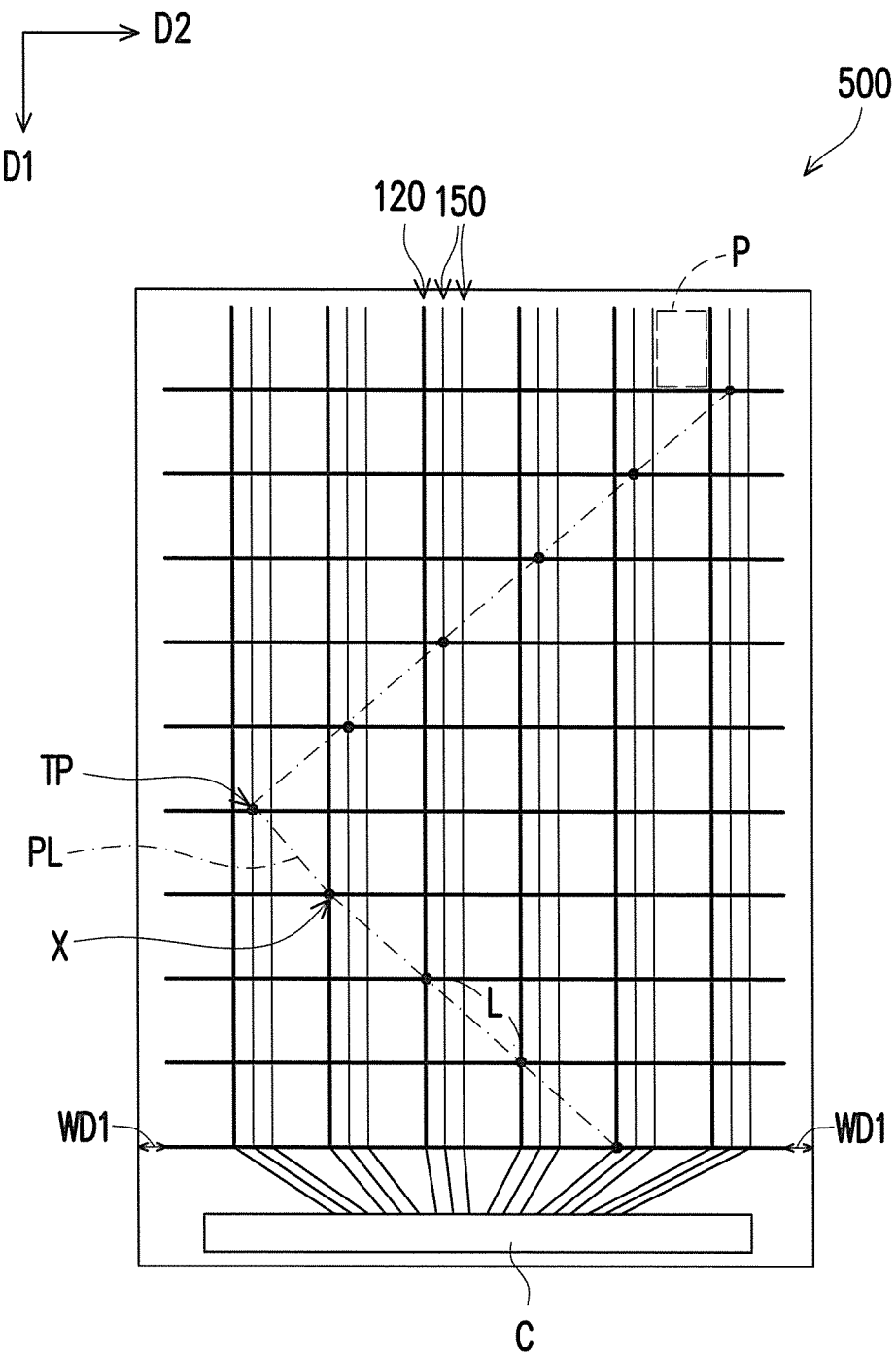

Referring to FIG. 5, the difference between the pixel array 500 and the pixel array 100 of FIG. 1A is that the arrangement of the bridge points X. In the pixel array 100, before the turning point TP, the bridge points X are arranged from the upper left to the lower right of the pixel array 100, and after the turning point TP, the bridge points X are arranged from the upper right to the lower left of the pixel array 100. On the other hand, in the pixel array 500, the arrangement of the bridge points X before and after the turning point TP is opposite to the arrangement of FIG. 1A. FIGS. 2 to 4 may be improved with the same way, the description will be omitted.

Figure 6:
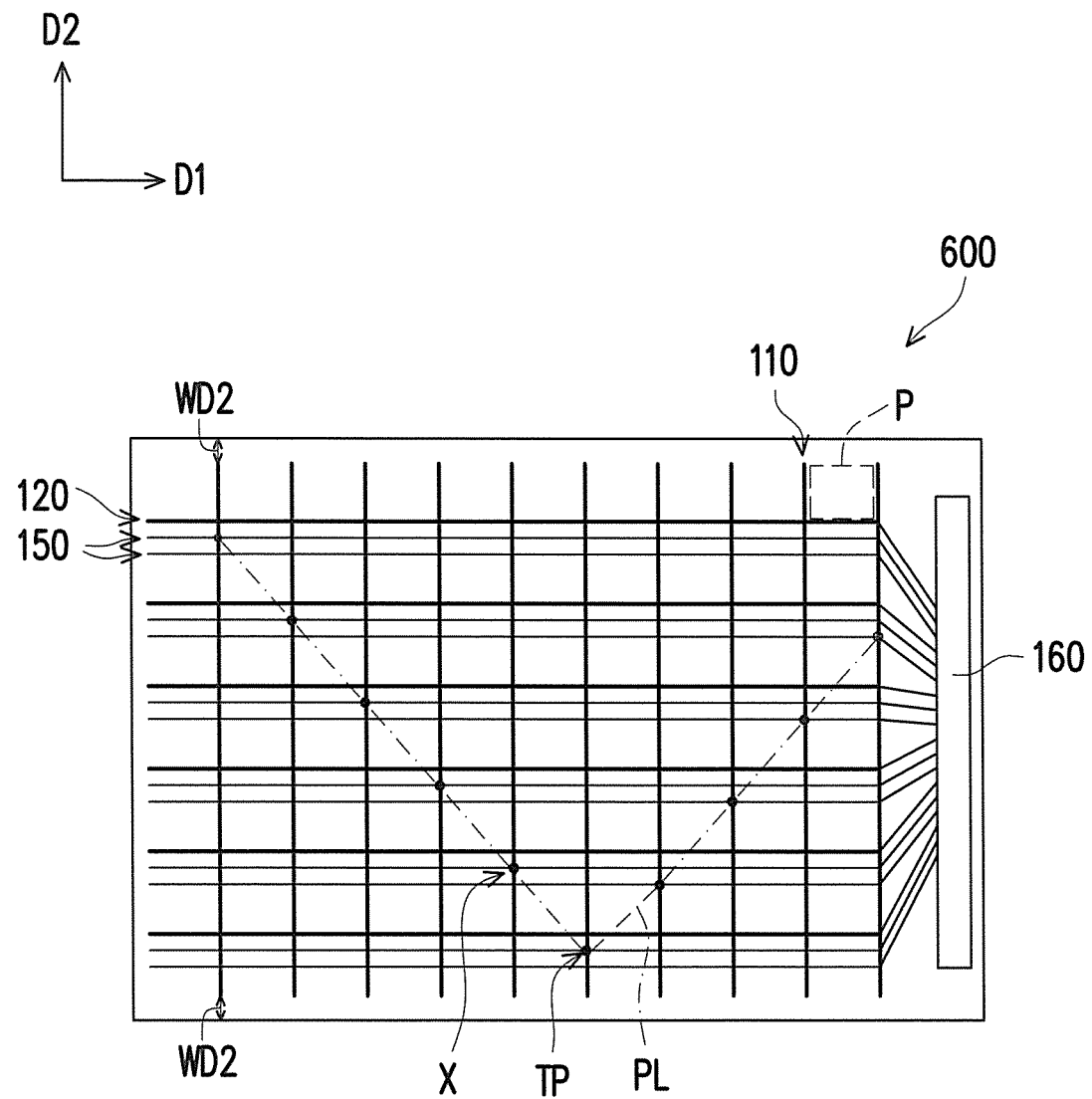

Referring to FIG. 6, the difference between the pixel array 600 and the pixel array 100 of FIG. 1A is described as follows. In the pixel array 100, the second signal lines 120 and the selection line 150 are wired from the underside of the pixel array 100, thereby availing to narrow the width WD1 of the non-display areas of the left and right sides of the pixel array 100. In the pixel array 600, the second signal lines 120 and the selection line 150 are wired from the right side of the pixel array 600, thereby availing to narrow the width WD2 of the non-display areas of the upper and lower sides of the pixel array 600.

In summary, the pixel array of the invention makes the amount of the second signal lines intersected with a connection line between the bridge points of the neighbouring first signal lines to be one, thereby decreasing the distance between the bridge points of the neighbouring first signal lines, reducing the difference of charging time for neighbouring pixels, improving the band mura phenomenon and enhancing the display quality.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A pixel array, comprising:
   a plurality of first signal lines;
   a plurality of second signal lines, electrically insulated from the first signal lines, and intersected with the first signal lines to define a plurality of pixel regions;
   a plurality of active elements, located in the pixel regions, and each of the active elements being electrically connected to a corresponding first signal line and a corresponding second signal line;
   a plurality of pixel electrodes, disposed corresponding to the pixel regions, and electrically connected to the active elements; and
   a plurality of selection lines, intersected with the first signal lines, wherein each of the first signal lines is electrically connected to one of the selection lines and has a bridge point at an intersection with the one of the selection lines, the selection lines are electrically insulated from the second signal lines, and at least one selection line is disposed between two neighbouring second signal lines, wherein amounts of the first signal lines and the selection lines are respectively larger than an amount of the second signal lines, and an amount of second signal lines intersected with a connection line between the bridge point of the ith first signal line and the bridge point of the (i+1)th first signal line is one, i=1 to N−1, and N equals to the amount of the first signal lines.

2. The pixel array as claimed in claim 1, wherein a line connected sequentially from the bridge point of the first one of the first signal lines to the bridge point of the last one of the first signal lines forms a polyline, and the polyline has at least one turning point.

3. The pixel array as claimed in claim 2, wherein plural of the selection lines are disposed between two neighbouring second signal lines.

4. The pixel array as claimed in claim 3, wherein plural of the bridge points are disposed between two neighbouring second signal lines.

5. The pixel array as claimed in claim 4, wherein an amount of the bridge points between the two neighbouring second signal lines is less than or equal to an amount of the selection lines between the two neighbouring second signal lines.

6. The pixel array as claimed in claim 2, wherein the bridge points are intersected respectively with different selection lines.

7. The pixel array as claimed in claim 2, wherein an amount of the at least one turning point is j, and an amount of the at least one selection line between the two neighbouring second signal lines is j or (j+1), where j≥1.

8. The pixel array as claimed in claim 2, wherein an amount of the at least one selection line between the two neighbouring second signal lines is k, and an amount of the at least one turning point is k or (k±1), where k≥2.

9. The pixel array as claimed in claim 1, wherein the selection lines and the pixel electrodes do not overlap.

10. The pixel array as claimed in claim 1, wherein the selection lines and the second signal lines are located on the same layer, and the selection lines and the first signal lines are located on different layers.

* * * * *